July 11, 1939. F. W. BILLKER ET AL 2,165,953
CUTTING MACHINE
Filed March 29, 1935 2 Sheets-Sheet 2
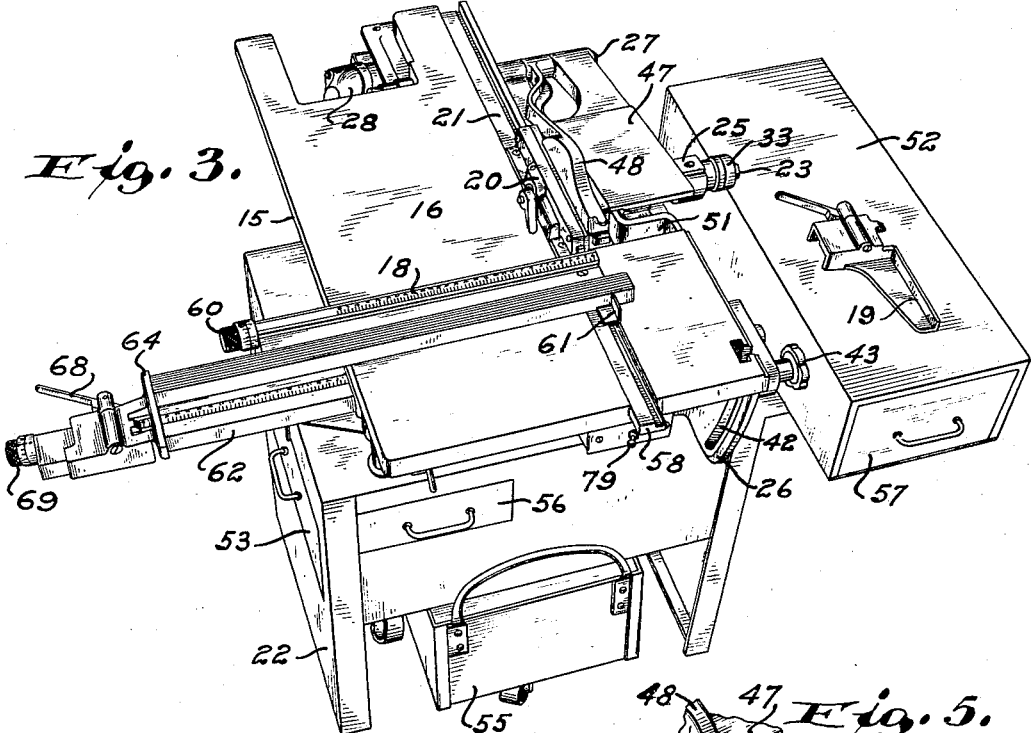
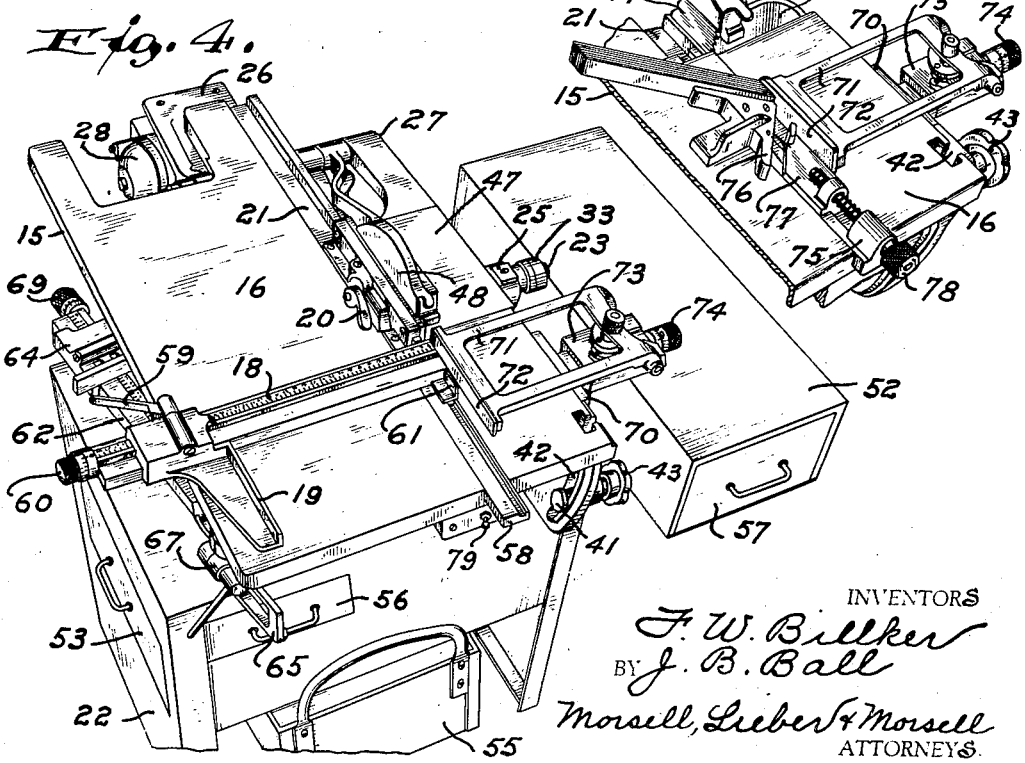
INVENTORS
F. W. Billker
BY J. B. Ball
Morsell, Lieber & Morsell
ATTORNEYS Patented July 11, 1939

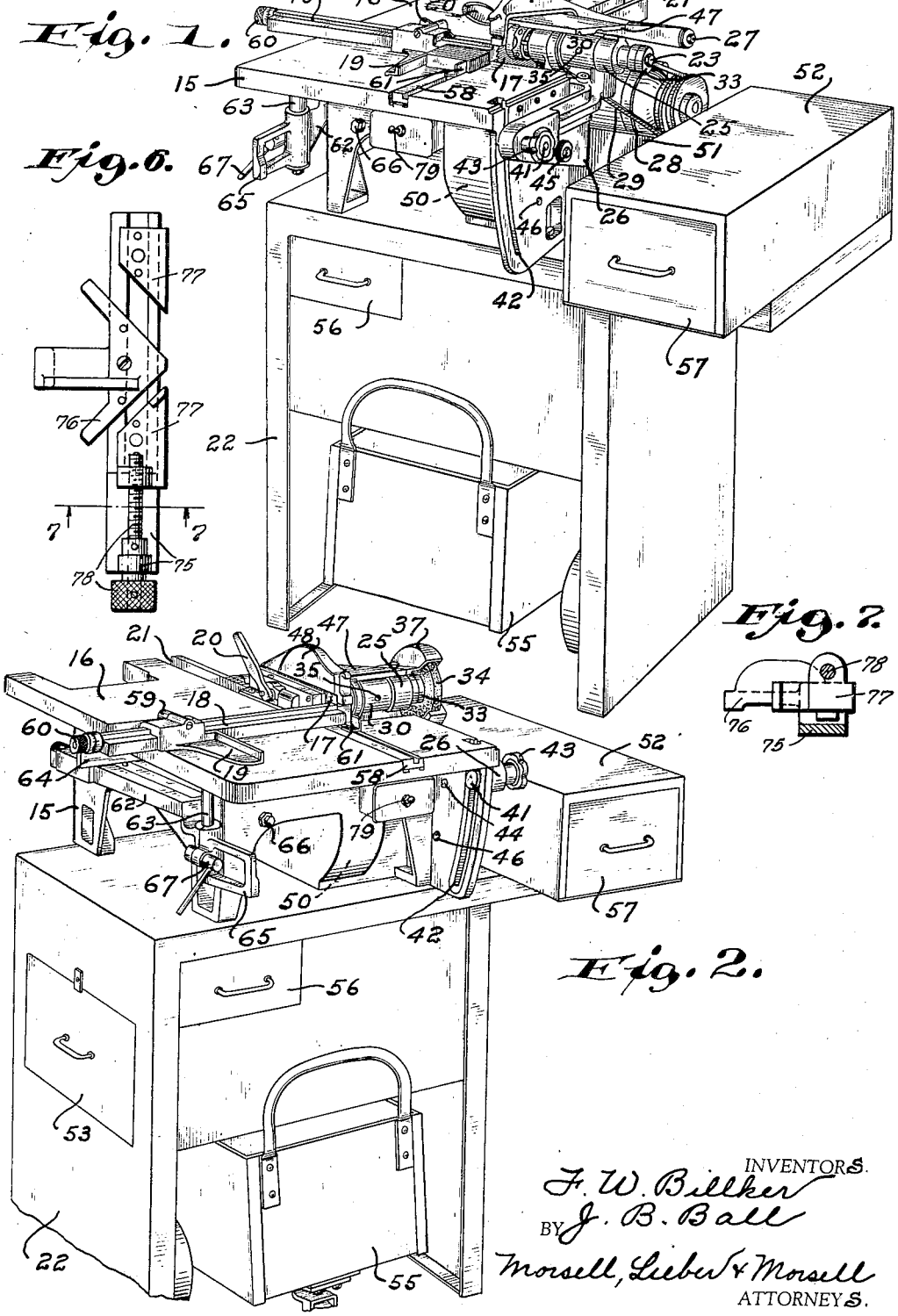

2,165,953

UNITED STATES PATENT OFFICE 2,165,953

CUTTING MACHINE

Fredrick W. Billker, Milwaukee, Wis., and John B. Ball, Chicago, Ill., assignors to Milwaukee Saw Trimmer Corporation, Milwaukee, Wis., a corporation of Wisconsin Application March 29, 1935, Serial No. 13,604

20 Claims. (Cl. 29—69)

The present invention relates generally to improvements in the construction and operation of cutting machines of the class employed in the composing rooms of printing establishments for the purpose of cutting and trimming type bars, slugs, borders, plates, or other typographical stock.

Generally stated, an object of the invention is to provide improved cutting mechanism which is simple and durable in construction, and which is moreover highly efficient and flexible in use.

Another object of the invention is the provision of new and useful gage mechanisms which are especially adapted for use in connection with cutting machines for the composing rooms of printing establishments, and which will greatly enhance the utility of such machines.

Still another object of the invention is to provide improved line-up gage structure for a cutting machine, which is readily movable into and out of operative position, and which is cooperable either with ordinary or mitre stock clamping and gage mechanism.

An additional object of the invention is to provide an improved extension gage for type stock cutting machines, which will enable convenient and accurate trimming of relatively long stock.

Another object of the invention is to provide improved extension gage structure which may be readily swung into and out of operative position, and which is unobstructive when not in use.

A further object of the invention is to provide an improved mitre gage assembly which is adapted to hold the work for cutting mitres in opposite directions and without inverting the work.

Still another object of the invention is to provide improved gage bracket holding or locking structure which can be easily manipulated.

Another object of the invention is to provide various other improvements in the details of construction of cutting machines, whereby the cost of construction and operation is reduced to a minimum, while the general utility thereof is enhanced to a maximum.

These and other objects and advantages will be apparent from the following detailed description:

A clear conception of embodiments of the several new features, and of the mode of constructing and of operating cutting machines built in accordance with the improvements, may be had by referring to the drawings accompanying and forming a part of this specification in which like reference characters designate the same or similar parts in the various views.

Fig. 1 is a perspective view of one of the improved cutting machines, looking at the right hand side, front and top, with the saw adjusted for normal cutting, the dressing wheel removed from the saw shaft, the line-up gage removed from the machine, and the extension gage swung to inoperative position;

Fig. 2 is another perspective view of the cutting machine, looking at the left hand side, front and top, with the saw again in normal cutting position, the dressing wheel applied to the saw shaft, the line-up gage removed, and the extension gage in inoperative position;

Fig. 3 is an additional perspective view of the machine, looking toward the top, front and left hand side, with the saw in normal cutting position, the dressing wheel removed, the normal gage bracket removed, the line-up gage removed, and the extension gage in action;

Fig. 4 is a similar perspective view of the mechanism, again looking toward the top, front and left hand side, with the saw set for undercutting, the dressing wheel removed, the line-up gage in use, and the extension gage in inactive position;

Fig. 5 is a fragmentary similar perspective view of the top and front portions of the machine, showing the improved line-up gage cooperating with improved mitre clamping mechanism;

Fig. 6 is a top view of the improved mitre clamping assemblage alone; and

Fig. 7 is a transverse vertical section through the mitre clamp, taken along the line 7—7 of Fig. 6.

While the features of the improvement have been shown and described as being applied to a particular type of sawing and trimming machine, it is not intended to unnecessarily restrict the scope by such specific embodiment, since some of these features may obviously be susceptible of more general application.

Referring to the drawings, the improved cutting machine illustrated therein, comprises in general a stationary frame 15 having a main upper substantially horizontal work-supporting surface 16; a rotary cutter or saw 17 swingably supported by the frame 15 for movement through a slot therein, and cooperable with the work resting upon the surface 16; a gage bar 18 and a gage bracket 19 cooperable therewith for moving the work along the surface 16 past the saw 17; clamping mechanism 20 coating with the gage bar 18 and movable within a slot 21 in the frame 15 to insure simultaneous advancement of the work with the gage bar; and a cabinet 22 for supporting the main frame 15 and having structure therein for properly distributing the cuttings.

The main frame 15 is of sturdy construction and is permanently attached to the supporting cabinet 22 so as to permit handling of the interconnected elements, as a unit. The saw 17 is detachably secured to one end of a shaft 23 mounted in spaced bearings 25 carried at the forward end of a swingable frame 26, the medial portion of which is suspended from the fixed frame 15 by a pivot 27, and the rear portion of which carries a propelling motor 28. The weight of the motor 28 thus tends to counter-balance the weight of the saw 17 and shaft 23, and the motor is drivingly connected to the shaft 23 by a belt 29 coacting with a pulley 30 secured to the shaft 23 between the bearings 25. The end of the shaft 23 remote from the saw 17, may be provided with collars 33 adapted to clamp an emery-wheel 34 to the outer shaft end, and the pulley 30 is preferably provided with a series of holes 35 formed for reception of a slidable pin 36 carried by the saw frame 26 so that the shaft 23 may be locked against rotation while the saw 17 or the emery-wheel 34, are being applied or removed. The emery-wheel 34 may be provided with a removable guard 37 attached to the adjacent bearing 25, as shown in Figs. 2.

As previously stated, the saw 17 and frame 26 are swingable about the pivot 27, and in order to definitely position the saw 17 relative to the work-supporting surface 16, the forward portion of the frame 26 is provided with positioning and locking structure such as shown in Figs. 1 and 2. The extreme forward end of the saw frame 26 carries a bolt 41 which is movable along an arcuate slot 42 formed in the main frame 15, and a hand nut 43 coacts with the bolt 41 so as to permit clamping of the frame 26 and resultant positioning of the saw 17 in any desired position relative to the surface 16. Since it is preferable during normal slug cutting, to have the central axis of the saw 17 in substantial alinement with the central horizontal plane of the work, the main frame 15 may be provided with a hole 44 which is engageable by a latch pin 45 carried by the forward portion of the frame 26 to positively lock the saw 17 in normal slug cutting position as shown in Fig. 9. This pin 45 is also engageable with a second hole 46 in the frame 26 to positively lock the saw 17 in plate cutting position. The work supporting table is also provided with a movable section 47 which is swingably supported upon the saw frame pivot 27 and is engageable with the bearings 25 when the latter are raised, so as to open a gap for the discharge of slugs and cuttings from the surface 16, but when plates are being cut the top surface of the sub-table 47 lies flush with the surface 16. A saw guard 48 which is also swingably supported by the frame pivot 27, and which has a lower surface 49 adapted to rest upon the table section 47, encloses the upper portion of the saw 17 and is movable with the section 47 when the latter is elevated, but when the saw 17 is lowered sufficiently, the guard 48 rests upon the work supporting surface 16.

The main frame 15 in advance of the saw 17, is provided with an integral rebound preventing curved surface 50 formed to prevent the chips and cuttings from bouncing back against the saw, and to direct these cuttings into a chute 51. The chute 51 may be part of the supporting cabinet 22 which may be provided with a galley-support 52 adjacent the upper end of the chute, and is adapted to deliver the soft metal into a waste-receiving box or car 55 disposed within the cabinet space beneath the drawer 53. The cabinet 22 may also be provided with a tool drawer 56 above the cuttings-receiving drawer 53 and laterally adjacent to the lower end of the main chute 51, and may also have another drawer 57 therein beneath the galley-rest 52.

The normal gage bar 18 is secured to and is guided by a slide 58 which coacts with and is movable along the groove 21, and the bracket 19 is slidable along the gage bar 18. The rear of the gage bar 18 is provided with a screw having threads which are engageable by a multiple-toothed block releasable by a lever 59 so as to free the bracket 19 for quick sliding along the gage bar; and the gage bar slide is adjustable relative to the bar itself so as to accurately position the bracket 19, by means of a vernier adjustment 60. The clamping mechanism 20 is of the type shown in U. S. Patent #1,463,545, granted July 31, 1923, and embodies a clamping jaw 61 which is directly cooperable with a piece of work coacting with the gage bar 18 and bracket 19, and this clamping mechanism is movable past the saw 17 when the gage bar 18 is advanced along the surface 16 and the slide 58 moves within the groove 21.

While the normal gage bar 18 and bracket 19, are ordinarily sufficient to handle work of usual length, these elements will not permit accurate cutting to definite dimensions, of bar stock having greater length than the range of the normal gage calibrations. When such abnormally long stock is to be cut, the normal bracket 19 may be removed from the bar 18 and the improved extension gage mechanism which is shown in action in Fig. 3, may be effectively utilized. The extension gage mechanism comprises an auxiliary support and gage bar 62 which is swingably and slidably supported upon a fixed pivot 63; and a positioning bracket 64 slidable along the bar 62 and cooperable with calibrations thereon. The gage bar 62 has a forwardly extending integral projection 65 which is cooperable with an adjustable stop 66 carried by the main frame 15 in order to limit the forward swing of the bar 62; and may be slid vertically along its supporting pivot 63 so as to bring the upper surface of the gage bar 62 into horizontal alinement with the main work-supporting surface 16. When the extension gage bar has been thus elevated and positioned as shown in Fig. 3, it is adapted to be clamped in position by means of a clamp 67 release of which will cause the bar 62 to drop downwardly and to become freely swingable out of operative position beneath the overhanging edge of the frame 15, as shown in Figs. 2 and 4. The bracket 64 carries a multiple toothblock which is manipulable by a lever 68, and which cooperates with a threaded rod associated with the rear of the gage bar 62, this slide being adjustable to accurately position the bracket 64 by means of another vernier adjustment 69. The extension gage mechanism is not movable bodily with the normal gage bar 18 and merely serves to properly position the work relative to the plane of cutting of the saw 17, until the clamping mechanism 20 is actuated to lock the work to the bar 18, whereupon the work may be moved toward the cutter and away from the extension gage bar 62.

The improved line-up mechanism which is shown in action in Figs. 4 and 5, is cooperable either with the normal straight line gage and clamp or with a mitre gage and clamp. This line-up gage mechanism comprises a bracket 70 adapted to be removably attached to the end of the main frame 15, a gage bracket 71 having an elongated edge plate 72 disposable either in or parallel to the plane of cutting, and a member 73 pivotally supporting the bracket 71 and slidable along the bracket 70 by means of a vernier adjustment 74. The edge plate 72 of the line-up mechanism, may be utilized to properly position several type bars or borders relative to each other and to the work gage and clamping mechanisms, and the bracket 71 may be swung about its pivotal support to position the edge of the plate 72 directly over the work, or removed therefrom.

As previously stated, the line-up device may be used either in conjunction with the normal gage and clamping mechanisms as shown in Fig. 4, or with a mitre gage and clamp as shown in Fig. 5. The improved mitre gage and clamp mechanism shown in Figs. 5, 6 and 7, comprises a special slide 75 disposed within and movable along the groove 21 in the main frame 15; a mitre block 76 rigidly attached to the slide 75; a clamping member 77 movably supported by the slide 75 and having oppositely directed inclined clamping jaws alternately cooperable with the mitre surfaces of the block 76; and an adjustable screw rod 78 adapted to move the member 77 relative to the block 76 in opposite directions. As shown in Fig. 5, the member 77 is being urged forwardly by the rod 78 to clamp a piece of work against the rear inclined face of the block 76, but when an oppositely directed mitre is to be cut, the work may be clamped against the forward inclined face of the block 76 as will be clearly apparent from Fig. 6, by merely manipulating the rod 78 so as to urge the member rearwardly. When the work has been thus clamped to the block 76, the associated elements may be moved past the saw 17 in an obvious manner.

During normal operation of the improved cutting machine, the saw 17 may be set in motion at the will of the operator, by manipulating a switch 79 disposed at the front of the machine. Depending upon the class of work being operated upon, the saw 17 may be adjusted to any desired position relative to the work supporting surface 17, by manipulation of the hand nut 43 and subsequent swinging of the frame 26 so as to bring the saw 17 in the desired position of adjustment. When the saw 17 is set in the position illustrated in Fig. 7, the pin 45 engages the hole 44 in the frame 15 and locks the saw support 26 in normal cutting position. When plates are to be trimmed, the support 26 may be swung downwardly and locked in such position by the engagement of the pin 45 with the hole 46 in the frame. The hand nut 43, however, permits setting of the saw 17 in any intermediate position and also permits lowering of the saw for undercutting, and it will be noted that when the saw 17 is elevated as in Fig. 7, the table section 47 is also elevated to open a gap for discharge of slugs, and the saw guard 48 then moves with the table section 47.

When the saw 17 has been properly positioned relative to the work supporting surface 16, either a normal gage bar 18 or a mitre gage block 76 may be utilized to advance the work along the groove 21 and past the saw. If the stock which is being cut is of less length than the bar 18, the bracket 19 may be utilized to accurately position the work relative to the clamp 61, as shown in Fig. 4. If the stock is of greater length than the limits of travel of the bracket 19, this bracket may be removed and the extension gage bar 62 may be utilized in the manner indicated in Fig. 3, to definitely position the work relative to the clamp 61. If it is desired to produce mitre cuts, the mitre clamping mechanism of Figs. 5, 6 and 7 may be utilized, and it is to be observed that the removable line-up mechanism shown in Figs. 4 and 5 may be employed in conjunction with either type of clamp. The line-up gage has a relatively long line-up plate 72 and may be swung clear of the work so as not to interfere with normal advancement thereof toward the saw. This line-up gage mechanism may also be readily removed from the machine so as to avoid undesirable obstruction, and the extension gage bar 62 may likewise be displaced from normal position and disposed at the side of the main frame 15 as clearly shown in Fig. 4 in order to avoid such obstruction.

It should be understood that it is not desired to limit the present invention to the exact details of construction and to the precise mode of operation herein shown and described, for various modifications within the scope of the claims may occur to persons skilled in the art.

It is claimed and desired to secure by Letters Patent:

1. In a cutting machine, a frame, a cutter cooperable with said frame, means comprising a gage bar and clamp for advancing work over said frame past said cutter, and an extension gage for definitely positioning abnormally long work relative to said bar and clamp, said extension gage being pivotally attached to said frame at the side of said work advancing means remote from said cutter.

2. In a cutting machine, a frame having an upper work supporting surface, a cutter cooperable with work resting upon said surface, means comprising a gage bar and clamp for advancing work along said surface past said cutter, and an extension gage cooperable with the end of said gage bar remote from said cutter to definitely position abnormally long work relative to said clamp, said extension gage having an upper work supporting surface horizontally alineable with said frame surface and being mounted on said frame for bodily movement away from said surface.

3. In a cutting machine, a frame having an upper work supporting surface, a cutter cooperable with work resting upon said surface, means comprising a gage bar and clamp for advancing work along said surface past said cutter, and an extension gage cooperable with the end of said gage bar remote from said cutter to definitely position abnormally long work relative to said clamp, said extension gage having an upper surface alineable with said frame surface, and being movable downwardly and swingable rearwardly toward the side of said frame.

4. In a cutting machine, a frame having a work support, a cutter at one side of said support and cooperable with the work resting upon the upper surface of said support, a movable bar carried by and spanning said support for advancing the work past said cutter, and an extension gage movably suspended directly from said frame on the opposite side of said support, said extension gage having an upper surface horizontally alineable with said support surface.

5. In a cutting machine, a frame having a work support, a cutter at one side of said support and cooperable with the work resting upon the upper surface of said support, a movable bar carried by and spanning said support for advancing the work past said cutter, and an extension gage movably suspended from said frame on the opposite side of said support, said extension gage having an upper surface horizontally alineable with said support surface and being bodily swingable about a vertical axis to position the same closely adjacent to said frame when not in use.

6. In a cutting machine, a frame having a work support, a cutter at one side of said support and cooperable with the work resting upon the upper surface of said support, a movable bar carried by and spanning said support for advancing the work past said cutter, and an extension gage movably suspended directly from said frame on the opposite side of said support, said extension gage having an upper surface horizontally alineable with said support surface and being bodily downwardly movable to lower the same away from said support surface when not in use.

7. In a cutting machine, a frame having a work support, a cutter at one side of said support and cooperable with the work resting upon the upper surface of said support, a movable bar carried by and spanning said support for advancing the work past said cutter, and an extension gage movably suspended from said frame on the opposite side of said support, said extension gage having an upper surface horizontally alineable with said support surface and being mounted for bodily swinging and downward movement about a vertical axis to position the same near the side of said frame and below said support surface when not in use.

8. In a cutting machine, a frame, a cutter at one side of said frame, a work conveying bar slidable laterally over said frame to advance the work thereover, and an extension gage movably suspended from the opposite side of said frame, said extension gage being alineable with said bar to properly position abnormally long work relative to said cutter and being swingable about an axis to position the gage closely adjacent said frame when not in use.

9. In a cutting machine, a frame, a cutter at one side of said frame, a bar slidable laterally over said frame to advance the work thereover, and an extension gage movably suspended from the opposite side of said frame, said extension gage being cooperable with said bar to properly position abnormally long work relative to said cutter and being bodily downwardly movable and swingable about a vertical axis to position the same below the work supporting surface of the frame and closely adjacent thereto when not in use.

10. In a cutting machine, a frame having a work supporting surface, a cutter at one side of said support, a movable bar spanning said surface laterally of said cutter for definitely positioning the work relative to the plane of cutting, a vertical pivot carried by said frame near the opposite side of said support, and an extension gage swingably and slidably associated with said pivot.

11. In a cutting machine, a frame having a work supporting surface, a cutter at one side of said support, a movable bar spanning said surface laterally of said cutter for definitely positioning the work relative to the plane of cutting, a vertical pivot carried by said frame near the opposite side of said support, and an extension gage swingably and slidably associated with said pivot, said extension gage being alineable with said bar and having an upper surface alineable with said work supporting surface.

12. In a cutting machine, a work support having a groove therein, a cutter located adjacent said groove, a mitre block movable along said groove past said cutter and having front and rear work engaging surfaces which are oppositely inclined relative to the plane of cutting, and a single clamping unit slidable along said groove in opposite directions to interchangeably clamp work against said surfaces.

13. In a cutting machine, a work support having a guide thereon, a cutter located adjacent said guide, a mitre block movable along said guide past said cutter and having different work engaging surfaces which are oppositely inclined relative to the plane of said guide, and a single clamping unit slidably supported by said block and reversely movable to interchangeably clamp work against said surfaces.

14. In a cutting machine, a work support having a guide thereon, a cutter located adjacent said guide, a mitre block movable along said guide past said cutter and having different work engaging surfaces which are oppositely inclined relative to the plane of said guide, a single clamping unit slidably supported by said block and reversely movable to interchangeably clamp work against said surfaces, and means at the end of said block remote from said cutter for effecting adjustment of said clamping unit in either direction.

15. In a cutting machine, a work support having a groove therein, a cutter located adjacent said groove, a mitre block movable along said groove past said cutter and having front and rear work engaging surfaces inclined relative to the plane of cutting, a single clamp slidable relative to said block and reversely movable to interchangeably clamp work against said surfaces, and means at an end of said block remote from said cutter for effecting adjustment of said clamp in either direction.

16. In a cutting machine, a frame having a work supporting surface, a cutter adjacent said surface, a bar slidable over said surface to advance work past said cutter, a pivot carried directly by said frame, and an extension gage swingably and slidably associated with said pivot.

17. In a cutting machine, a frame having an upper surface, a cutter adjacent said surface, a bar movable along said surface to advance work past said cutter, pivot means associated directly with said frame, and an extension gage swingably and slidably associated with said pivot means.

18. In a cutting machine, a frame having a work supporting surface, a cutter adjacent said surface, a work conveying bar movable along said surface to advance work past said cutter, and an extension gage movably supported by said frame, said gage being movable toward and away from the plane of said surface and into a position of alinement with said bar and also being movable beneath said frame when not in use.

19. In a machine of the character described including in combination, a saw, a table, a structure reciprocable parallel to the cutting plane of the saw comprising a double mitre block having an abutment provided with a work contacting surface inclined at 45° to said plane, a second abutment also having a work contacting surface inclined at 45° to said plane, oppositely with respect to the first surface, means to clamp a unit of work against one of said surfaces, and means actuated by the first means to clamp a second unit of work against the other of said surfaces.

20. In a cutting machine, a saw, a table, and an assemblage reciprocable upon said table parallel to the plane of cutting of said saw, said assemblage comprising a double mitre block having work contacting faces inclined in opposite directions with respect to said plane, means for interchangeably clamping a unit of work against either of said faces, and common means for actuating both of said clamping means.

FREDRICK W. BILLKER.
JOHN B. BALL.